March 25, 1941. J. GALAMB 2,235,875
DOOR SUPPORT
Filed July 6, 1937 2 Sheets-Sheet 1
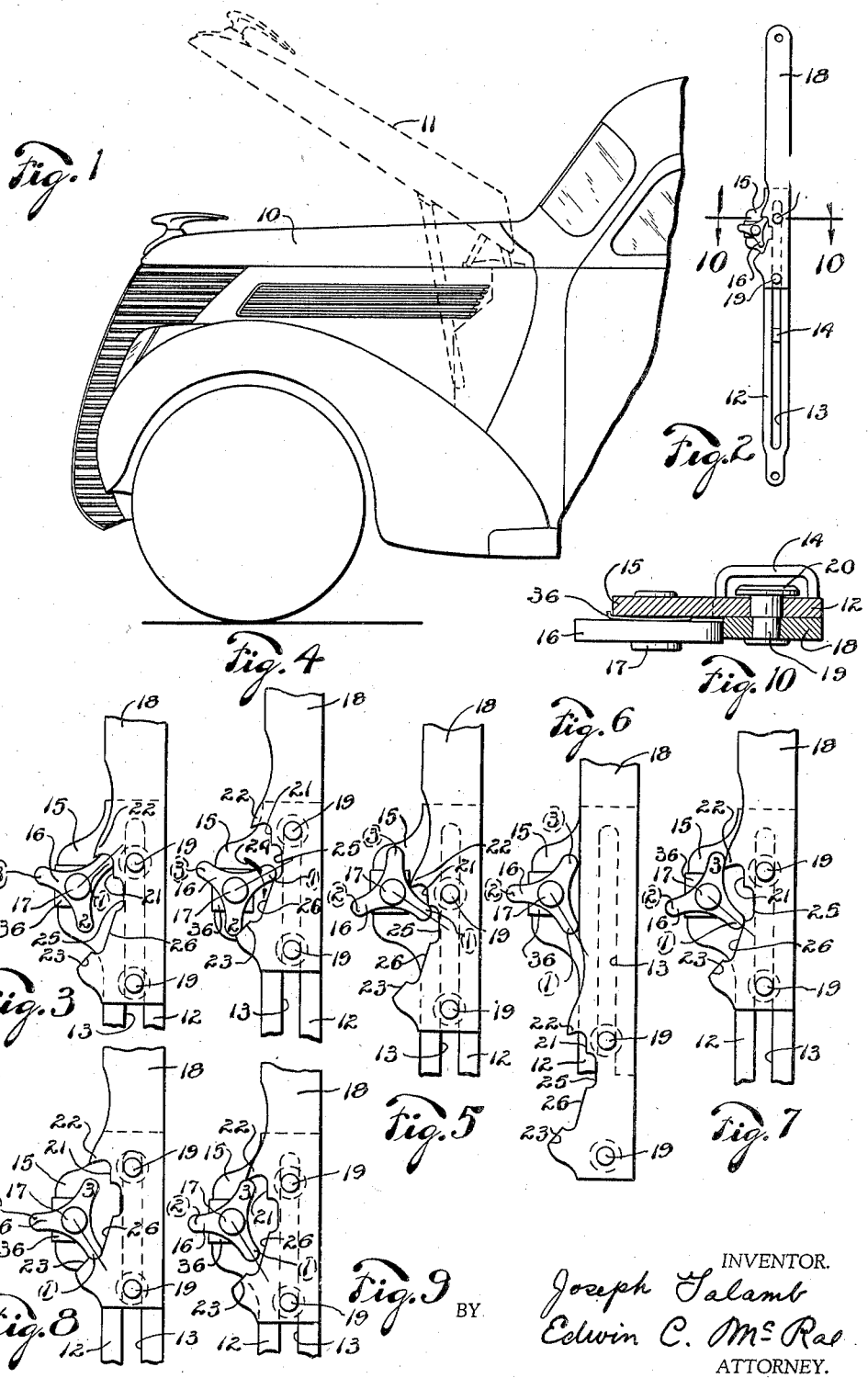
INVENTOR.
Joseph Galamb
BY Edwin C. McRae
ATTORNEY.

March 25, 1941. J. GALAMB 2,235,875
DOOR SUPPORT
Filed July 6, 1937 2 Sheets-Sheet 2

INVENTOR.
Joseph Galamb
BY Edwin C. McRae
ATTORNEY.

Patented Mar. 25, 1941

2,235,875

UNITED STATES PATENT OFFICE 2,235,875

DOOR SUPPORT

Joseph Galamb, Detroit, Mich., assignor to Ford Motor Company, Dearborn, Mich., a corporation of Delaware Application July 6, 1937, Serial No. 152,280

1 Claim. (Cl. 217—60)

The object of my invention is to provide a door support which will hold a vehicle trunk door or vehicle hood in an elevated position when desired. My improved door support is designed to automatically hold the door in its opened position upon the door being raised. After the door has come to rest in its open position and is again raised slightly from its open position, the holding means is released to allow the door to be lowered to its closed position. This permits the door to be opened and held in this position with only the use of one hand, whereas two hands are required with the usual trunk door support.

The applicant is aware that numerous types of mechanisms have been designed to accomplish the identical purpose of the applicant's device, but most of these are objectional in that they are not positive in operation, that is, they depend upon the force of gravity or the operation of a spring to move some part to effect the release or support of the door. The object of the applicant's device is to provide a hood support of the class described wherein the holding means is positively moved to position every other time the trunk door is raised. In case any of the parts become stuck so that the supporting mechanism will not function, it will be impossible to raise the lid. Thus the operator can be assured if he is able to raise the lid that upon the release of same it will be supported.

Two designs of my improved support are shown; one being a telescopic support adapted to hold the hood of an automobile in its raised position, while the other is a hinged support adapted to hold the door of a vehicle trunk in its elevated position. The same invention is employed in both of these devices.

With these and other objects in view, my invention consists in the arrangement, construction and combination of the various parts of my improved device, as described in this specification, claimed in my claim, and illustrated in the accompanying drawings, in which:

Figure 1 is a side elevation of the front portion of a motor vehicle, having my improved support installed thereon. The position of the hood support when the hood is open is shown by dotted lines in this view.

Figure 2 is a side elevation of the hood support shown in Figure 1.

Figures 3 through 9 show the various parts of the support in progressive stages through one complete cycle of lowering and then raising the hood to its locked position.

Figure 10 is a section taken on line 10—10 of Figure 2.

Figure 11:
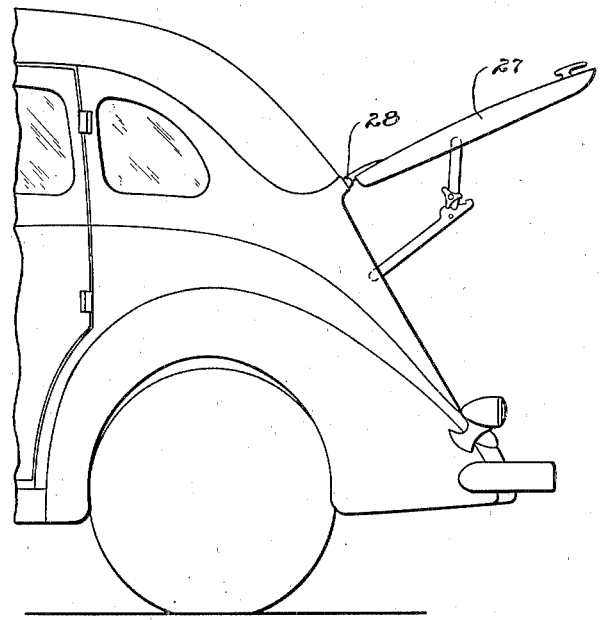
Figure 11 shows a side elevation of the rear portion of the vehicle having my invention in a form of a hinged type of support for holding the trunk door in its open position.

Referring to Figure 1, I have used the reference numeral 10 to indicate the hood which covers the engine compartment of a motor vehicle. This hood is hinged at its rear edge so as to swing to a position shown by dotted line 11. My improved hood support comprises a pair of telescopic members, the lower member of which is pivotally secured to the vehicle dash while the upper end of the other member is pivotally secured to the underside of the hood 11 at a point spaced forwardly from its hinged edge. It is immaterial which of the two members comprising my support is secured to the body as the device is adapted to work equally well in any position.

One of the telescopic members, the lower member in this installation, is formed as a relatively flat bar 12 having an elongated slot 13 therein extending nearly the full length thereof. A U-shaped brace 14 is fastened to the back of the bar 13 intermediate of the ends of the slot 13, the purpose of which is to prevent distortion of the bar or spreading of the slot 13 from bending strains. The upper end of the bar 12 is provided with a laterally extending ear 15 and a three-tooth star wheel 16 is pivotally mounted upon the ear 15 by means of a pin 17. The wheel 16 is rotatably mounted on one side of the ear 15. A flat spring 36 prevents the wheel 16 from spinning, although it is relatively free to turn.

The upper member of the telescopic unit comprises a bar 18 having a pair of guide rivets 19 secured therein, one near its lowermost end and the other spaced a short distance upwardly therefrom. These rivets are each provided with a head 20, the rivets extending through the slot 13 and the head 20 preventing their disengagement from the slot 13. The bar 18 is thus free for telescopic movement from the bottom of the slot 13 to the upper end thereof. The U-shaped bracket 14 has sufficient height that the heads 20 of the rivets slide therebeneath.

That portion of the bar 18 adjacent to the lower end is provided with a cam member having a face 21 of irregular contour which coacts with the star wheel 16 to effect the function of this device.

It will be noted that the star wheel 16 is provided with three teeth and that a line is drawn from the center of the wheel outwardly through one of the teeth. This line is used solely to show the rotary movement of the wheel. Through one cycle of operation the star wheel 16 rotates through 120° and the designating line is placed thereon to better visualize this movement of the wheel.

Referring to Figure 3, I have shown the members in position where the hood is supported, as shown by dotted lines 11, in Figure 1. In this position a projection 22 on the cam face 21 bears against one of the teeth of the star wheel 16, designated as number 1 tooth, thereby wedging the cam face laterally so that the rivets are pressed against the far edge of the slot 13. In this position it is impossible for the bar 18 to slide downwardly on the bar 12. In order to telescope the members, the hood must first be raised to the position shown in Figure 4. When in this position, a cam 23 on the end of the cam face 21, bears against the lowermost tooth, numbered 2, of the star wheel to cause movement of the wheel in the direction of arrow 24. A notch 25 is cut in the cam face 21 between the projection 22 and cam 23, so that number 1 tooth is rotated into this notch by the action of cam 23 upon the number 2 tooth. If now the hood is lowered, the upper end of the notch 25 bears against the number 1 tooth and rotates the star position shown in Figure 5. Upon the continued lowering of the bar 18 the projection 22 bears against the number 1 tooth to rotate the wheel to the position shown in Figure 6. The bar 18 may then be lowered to the full extent permitted by the hood.

When it is desired to raise the hood, the bar 18 is drawn upwardly, the upper face of the projection striking against the number 1 tooth and rotating it a few degrees in a clockwise direction. It will be noted from Figure 7 that the upper edge of the projection 22 strikes against number 3 tooth of the star wheel rotating it counterclockwise to the position shown in Figure 7. If now the bar 18 is raised still further, the number 1 tooth of the star wheel bears against a cam 26 on the face 21 which is disposed at such an angle that the star wheel is rotated clockwise to the position shown in Figure 8, where a shoulder between the cams 23 and 26 bears against the end of the number 1 tooth to stop further extension of the members. The clockwise movement of the star wheel effected by the cam 26 has moved the number 3 star wheel tooth to the position shown in Figure 8. If now the hood is lowered, the underside of the projection 22 strikes against the upper end of the number 3 tooth, as shown in Figure 9. When the weight of the hood is impressed thereon, the star wheel moves to the original position shown in Figure 3 where the hood is held in its open position.

From the foregoing it will be seen that each time the above mentioned cycle is completed, the star wheel 16 has been rotated in a clockwise direction through 120°. It will be further noted that in no instant during the cycle is the star wheel permitted free movement in either direction. Consequently, the star wheel cannot spin. No springs are provided for rotating the wheel or returning the parts to their original positions and, consequently, the device will invariably function unless the wheel becomes bound for any reason. In this case it will be impossible to move the hood as the wheel must rotate before the hood may be fully raised. The operator is thereby assured that if the hood can be raised to its upper position that he may feel free to let go of same and under no circumstances will the hood drop. This is a very important feature of the applicant's device in connection with automobiles as the type of hood shown has in the past been a source of accidents, due to the hood dropping on the fingers of the operator.

Referring to Figures 11 through 17, I have shown this invention when applied to a hinged-type of support which is especially adapted for use in connection with trunk lids and the like. The trunk lid has been given the reference numeral 27 and is hinged at 28 to the rear of the car. The trunk lid support is composed of two members 29 and 31, which instead of being telescoped together, as was the hood support previously described, are hinged together at the center by rivet 30 and have their free ends pivotally secured to the body and trunk lid of the car respectively. The star wheel 16 is in this case pivotally secured to the arm 29 a short distance above the rivet 30, this star wheel being identical to that shown in Figures 2 through 9 of the drawings.

In this form of my invention the uppermost member is provided with the star wheel and the lower member is provided with a cam face, while in the previously described structure the star wheel was fixed to the lower member and the cam face was formed on the upper member.

The cam face in this installation has been given the reference numeral 32 and consists of a socket 33 in which the number 1 tooth of the star wheel projects. The abutting end of the number 1 tooth and the socket 33 is offset laterally from the line joining the center of the star wheel axis and the rivet 30 so that the further pivotal movement of the arm 29 in a counterclockwise direction around the rivet 30 is prevented and the lid is supported. If now it is desired to lower the trunk lid, the lid is first moved upwardly a few degrees from the position shown in Figure 11, to cause the arm 29 to swing clockwise around the pivot 30. An edge 37 on the upper end of bar 31 strikes against the number 3 star wheel tooth and rotates the star wheel counterclockwise to the position shown in Figure 13. The number 1 tooth has then been moved to position over a notch 34 which corresponds to the notch 25 in the previous design. When the trunk door is let down, the arm 29 swings in a counterclockwise direction around the pivot 30 and the tooth 33 is positively rotated through the position shown in Figure 14 to the position shown in Figure 15. This is the position of the star wheel when the trunk door is closed.

Figure 12:
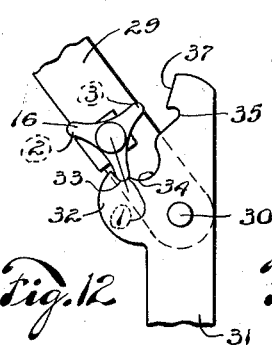
Figures 12 through 17 show progressive positions of the parts of this form of trunk lid support during one cycle of closing and opening the trunk door.
Figure 13:
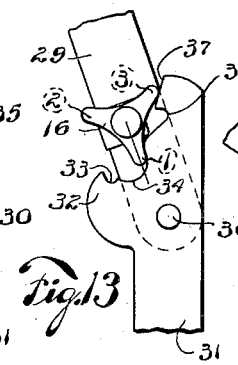
Figure 14:
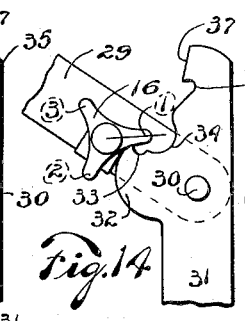
Figure 15:
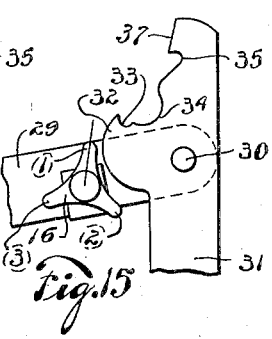
Figures 16, 17:
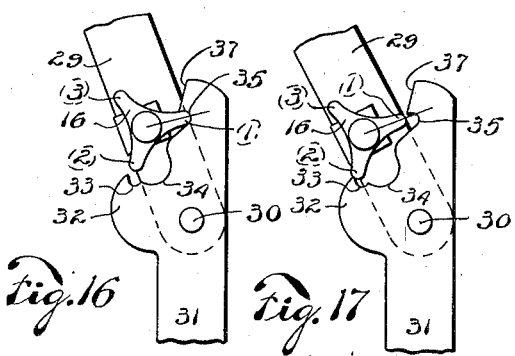

If it is now desired to open the trunk door, the same is lifted which rotates the arm 29 in a clockwise direction up beyond the position shown in Figure 15 to that shown in Figure 16. When this occurs, the outer portion of the cam beyond the socket 33 bears against the number 2 tooth to thereby direct the number 1 tooth into a notch 35 formed between the edge 37 and the notch 34. If now the door is allowed to drop, the arm 29 is rotated in a counterclockwise direction and the number 2 tooth is forced to enter the socket 33 to thereby support the lid, as shown in Figure 12.

From the foregoing, it will be seen that the two designs shown are essentially a single invention and that in one case the invention is applied to a pair of telescopic members with the cam faces formed on the end of one member and the star wheel formed on the other member, while in the other case the invention is applied to a hinged member with the star wheel secured to one portion of the hinge and the cam face formed on the adjacent portion. The invention in this case is believed to reside in the provision of a star wheel which is positively rotated through a certain definite angular movement without the use of springs or without spring urged dogs or the like. The advantage of this construction over all other automatic supporting devices known to the applicant is in the positive operation of the star wheel which ensures a degree of safety not heretofore provided with this type of mechanism. Where springs or gravity operated devices are provided, rust and dirt will cause a certain percentage of these devices to stick which, when same occurs, is a source of great danger to the user of such equipment.

Some changes may be made in the arrangement, construction and combination of the various parts of my improved device, without departing from the spirit of my invention, and it is my intention to cover by my claim such changes as may reasonably be included within the scope thereof.

I claim as my invention:

A support for an element of the class described comprising, a pair of articulated members, one of said members having a star wheel with three equally spaced teeth thereon rotatably mounted in position adjacent to its connection with the second of said members, said second member having a cam face formed thereon in position to coact with said star wheel and lock said members in element supporting position, one end of said cam face upon the maximum extension of said articulated members from said element supporting position striking one of the teeth of said star wheel and rotating same in one direction through a small fraction of the angular distance between said star wheel teeth, and upon the collapse of said members the other end of said cam face striking the next tooth to continuing the rotation of said wheel through substantially 120° angular distance, said cam face having a notch therein which upon the next extension of said members coacts with said last mentioned tooth to rotate said wheel a fractional part of said 120 degrees, and said cam face having a socket therein which upon the next collapse of said members coacts with the next tooth of said wheel and prevents further collapse of said members.

JOSEPH GALAMB.